(12) United States Patent
Huang et al.

(10) Patent No.: US 12,704,425 B2
(45) Date of Patent: Aug. 11, 2026

(54) METHOD AND MEASURING DEVICE FOR MEASURING REACTION FORCE AND TORQUE OF RESISTANCE MECHANISM ON FLYWHEEL

(71) Applicants: SETEC CORPORATION, Hsinchu County (TW); TIPSY INTERNATIONAL CO., LTD., Hsinchu (TW); Daniel Dallas Tsai, Taichung (TW)

(72) Inventors: Han-Rong Huang, Hsinchu (TW); Yen-Cheng Huang, Hsinchu (TW); Daniel Dallas Tsai, Taichung (TW)

(73) Assignees: SETEC CORPORATION, Hsinchu County (TW); TIPSY INTERNATIONAL CO., LTD., Hsinchu (TW); Daniel Dallas Tsai

( * ) Notice: Subject to any disclaimer, the term of this patent is extended or adjusted under 35 U.S.C. 154(b) by 402 days.

(21) Appl. No.: 18/223,244

(22) Filed: Jul. 18, 2023

(65) Prior Publication Data

US 2024/0019324 A1 Jan. 18, 2024

(30) Foreign Application Priority Data

Jul. 18, 2022 (TW) ................................. 111126838

(51) Int. Cl.

| | |
|---|---|
| ***G01L 3/24*** | (2006.01) |
| ***A63B 21/00*** | (2006.01) |
| ***A63B 21/015*** | (2006.01) |
| ***A63B 21/22*** | (2006.01) |

(Continued)

(52) U.S. Cl.
CPC ........ *G01L 3/242* (2013.01); *A63B 21/00192* (2013.01); *A63B 21/015* (2013.01); *A63B 21/225* (2013.01); *A63B 22/0605* (2013.01); *A63B 24/0062* (2013.01); *A63B 2220/35* (2013.01); *A63B 2220/51* (2013.01);
(Continued)

(58) Field of Classification Search
CPC .............................. G01L 3/242; A63B 21/225
See application file for complete search history.

(56) References Cited

U.S. PATENT DOCUMENTS

| | | | |
|---|---|---|---|
| 7,976,434 | B2 | 7/2011 | Radow et al. |
| 8,370,087 | B2 | 2/2013 | Zhu et al. |
| 8,965,610 | B2 | 2/2015 | Boyle |

(Continued)

FOREIGN PATENT DOCUMENTS

| | | |
|---|---|---|
| TW | 200526297 A | 8/2005 |
| TW | M503914 U | 7/2015 |

(Continued)

*Primary Examiner* — Stephanie E Bloss
*Assistant Examiner* — Diana Hancock
(74) *Attorney, Agent, or Firm* — ScienBiziP, P.C.

(57) ABSTRACT

A method and a device for measuring a tangential reaction force of a resistance device on a flywheel, and the reaction force multiply the radius of the flywheel to obtain a torque, such that the torque multiply a gear ratio is the torque to overcome the resistance of flywheel on the drivetrain. The torque to overcome the resistance of flywheel on the drive-train adding a torque to overcome the inertia of the flywheel and mechanical friction under the state of no resistance is the total torque presented on the drivetrain. Such that using the total torque to calculate power and energy consumption.

8 Claims, 8 Drawing Sheets

(51) Int. Cl.
*A63B 22/06* (2006.01)
*A63B 24/00* (2006.01)

(52) U.S. Cl.
CPC ..... *A63B 2220/54* (2013.01); *A63B 2220/833* (2013.01); *A63B 2230/75* (2013.01)

(56) References Cited

U.S. PATENT DOCUMENTS

| | | | | |
|---|---|---|---|---|
| 9,789,362 | B1 * | 10/2017 | Su | A63B 24/0075 |
| 10,996,099 | B2 * | 5/2021 | Mei | G01L 1/2243 |
| 2011/0111923 | A1 * | 5/2011 | Bacanovic | A63B 22/0605 482/8 |
| 2017/0106222 | A1 * | 4/2017 | Mayer | A63B 21/0051 |
| 2019/0031284 | A1 * | 1/2019 | Fuchs | A63B 22/0605 |
| 2019/0217144 | A1 * | 7/2019 | Petrillo | A63B 22/0605 |
| 2020/0256765 | A1 | 8/2020 | Okada | |

FOREIGN PATENT DOCUMENTS

| | | | | |
|---|---|---|---|---|
| TW | M552361 U | * | 12/2017 | A63B 22/0605 |
| TW | 201811404 A | | 4/2018 | |
| TW | I650539 B | | 2/2019 | |
| TW | 202202206 A | * | 1/2022 | A63B 24/0087 |
| TW | 202211955 A | * | 4/2022 | |

* cited by examiner

METHOD AND MEASURING DEVICE FOR MEASURING REACTION FORCE AND TORQUE OF RESISTANCE MECHANISM ON FLYWHEEL

CROSS-REFERENCE TO RELATED APPLICATION

The present disclosure claims the benefit of and priority to Taiwan Patent Application Ser. No. 111126838, filed on Jul. 18, 2022, entitled “Method of measuring resistive force to calculate power,” the content of which is hereby incorporated fully by reference into the present disclosure.

FIELD

The present disclosure generally relates to a method and a measuring device for measuring reaction force(s) of a resistance mechanism on a flywheel and, more particularly, a method and a measuring device for measuring tangential reaction force(s) and calculating the power of reaction force(s) of the flywheel.

BACKGROUND

It is well known that professional power meters for bicycles may provide important data such as torque, power and calorie consumption to be training references in addition to speed, distance, time, etc. Since most power meters for outdoor bicycles using strain gauge(s) installed on a pedal shaft, a crank or pedals, etc., it is inevitable to apply wireless transmission technology and rely on a strain analysis for a mechanism in order to achieve the calibration of a strain gauge, resulting in high costs that may hinder widespread use in simulated outdoor cycling training devices, such as indoor flywheel bicycles. However, there may not be any power meter on the current market that is applicable to flywheel bicycles with accurate measurement(s) and reasonable pricing. The methods, devices, etc. on current consumer market may not completely and accurately measure and calculate the torque and power consumed by a flywheel bicycle ridden by a rider. The prior related methods may use a pre-built comparison table relates to positions of a resistance mechanism, rotation speed versus torque, power, to regard as reference data during its usage. However, according to actual measurement data, it is shown that the actual power-rotation speed relation is not presented in a linear relations (refer to FIG. 3A to FIG. 3D), and the position and magnetic field strength or frictional coefficient varies greatly, such that the torque and power referenced from the pre-built comparison tables are far too different from the real-time actual measurement. Thus, the pre-built tables are used only for reference and have not been widespread used by most sports equipment manufacturers. The reaction force measured from the resistance mechanism, whether it is a contact-frictional resistance or a non-contact magnetic resistance, must be consistent with a tangential direction of a flywheel, and the torque must be correct to calculate a correct torque to overcome a resistance force of the flywheel. In other words, a resistance adjusting mechanism must move along a normal line passing through a flywheel shaft to ensure that the resistance mechanism moves along the tangential direction of the flywheel when subjected to a force. Most of measuring methods do not emphasize this important prerequisite nor propose solutions and devices for solving the problem, a slight angular deviation in the measurement may cause the subjected force has a component force which will affect the measurement accuracy.

Basically, the most important parameters displayed by power meters are torque (T, in unit: Newton meter), power (P in unit: Watt), and calorie consumption (Calorie, in unit: Cal). However, the parameters generally displayed by power meters for indoor exercise equipment are nothing more than speed (Speed), distance (Mileage), and accumulated exercise time (Time), and seldom include features of torque (T) and power (P). At most, the calories consumed are displayed, but most of them are estimated values rather than actual measured values.

Most of the traditional components equipped with strain gauges are rotary types of dynamic drive components, making it inevitable to apply a low-energy wireless transmission technology, and torque (Torque) measurement becomes the most critical factor, otherwise the subsequent calculation for power (P) and calorie consumption (Calorie) may not be done correctly. Since the traditional power meters are limited by high manufacturing costs, it is not cost-effective and may not be widely used in sports or medical rehabilitation equipment.

SUMMARY

In a first aspect of the present disclosure, a method for measuring a reaction force of a resistance mechanism on a flywheel, the method including the following: When the flywheel rotates, a reaction force of a resistance force which generated by the resistance mechanism drives resistance mechanism to move translationally in a tangential direction of the flywheel through a horizontal sliding mechanism, such that the resistance mechanism and a force sensor connectedly contact to each other in the tangential direction of the flywheel, and the horizontal sliding mechanism ensures the resistance mechanism to move translationally in the tangential direction of the flywheel and the reaction force may not be affected by an angular component force; and measuring the reaction force of a resistance force exerted by the resistance mechanism on the flywheel when the resistance mechanism connectedly contacts the force sensor, calculating the resistance force with the reaction force, and calculating a torque of a shaft of the flywheel with the calculated resistance force.

The present disclosure provides a method to calculate a torque applied on the flywheel by measuring a reaction force Fr of the resistance force exerted by a flywheel resistance mechanism. The torque applied on the flywheel conveys to the drivetrain via a chain, belt etc., then by multiplying a gear ratio to obtain a torque of a shaft of a drivetrain Tf. The torque of the shaft of the drivetrain Tf adds a torque of the drivetrain to overcome a mechanical friction and an inertia of the flywheel under a state of no resistance Tc to obtain a total torque Td of a drivetrain shaft, thereby calculating a power. Compared with consumer available power meters, the present disclosure does not need to transmit signals of a strain gauge installed on a drivetrain, a drive shaft, a crank or a pedal through wireless transmission technologies such as Bluetooth, ANT+, etc., and using a fixed force sensor to measure a reaction force Fr instead, which is parallel to a tangential direction of a flywheel. For a resistance mechanism including a contact resistance such as frictional resistance or a non-contact resistance such as magnetic resistance, thereby adding a torque Tf of a drivetrain shaft to overcome a flywheel resistance force exerted by a resistance mechanism and a torque Tc of the drivetrain to overcome a mechanical friction and an inertia of the flywheel under a state of no resistance equals to a total torque Td of a drivetrain shaft so as to further calculate a power P. The present disclosure is applicable to sports equipment or medical rehabilitation equipment with an adjustable resistance including a contact-frictional resistance or a non-contact magnetic resistance.

In a second aspect of the present disclosure, a measuring device is provided. The measuring device including a supporting base; a horizontal sliding mechanism disposed at a bottom of the supporting base; a resistance mechanism disposed on the horizontal sliding mechanism, where the resistance mechanism moves horizontally relative to the supporting base through the horizontal sliding mechanism; a vertical sliding mechanism, one side of the vertical sliding mechanism is fixed to a fixing mechanism and the other side of the vertical sliding mechanism is fixed to a side of the supporting base; a force sensor disposed on one side of the supporting base, where the force sensor and the supporting base may simultaneously move vertically relative to the fixing mechanism; a resistance adjusting mechanism having one end pressed against a plane of the supporting base; and an elastic mechanism connected to the supporting base, where an elastic force provided by the elastic mechanism causes the plane of the supporting base to be pressed against one end of the resistance adjusting mechanism under a normal condition.

In a third aspect of the present disclosure, a measuring device is provided. The measuring device including a base; a swing mechanism having a pivot fixed to the base, such that the swing mechanism is able to swing freely relative to the base with the pivot functioning as a center; a resistance mechanism disposed at a bottom of the swing mechanism, where the resistance mechanism swings with the swing mechanism; a force sensor having one end fixed on the base; a resistance adjusting mechanism connected with the base, where when the resistance adjusting mechanism is adjusted to press down, the base is brought downward; and an elastic mechanism connected to the base, where the elastic mechanism has one end connected to the base and the other end connected to a fixing mechanism, and when the resistance adjusting mechanism is adjusted back to an original state, the elastic mechanism pulls the base back.

BRIEF DESCRIPTION OF THE DRAWINGS

The present disclosure will be better understood from the following detailed description read in light of the accompanying drawings.

DETAILED DESCRIPTION OF THE PREFERRED EMBODIMENTS

Figure 1A:
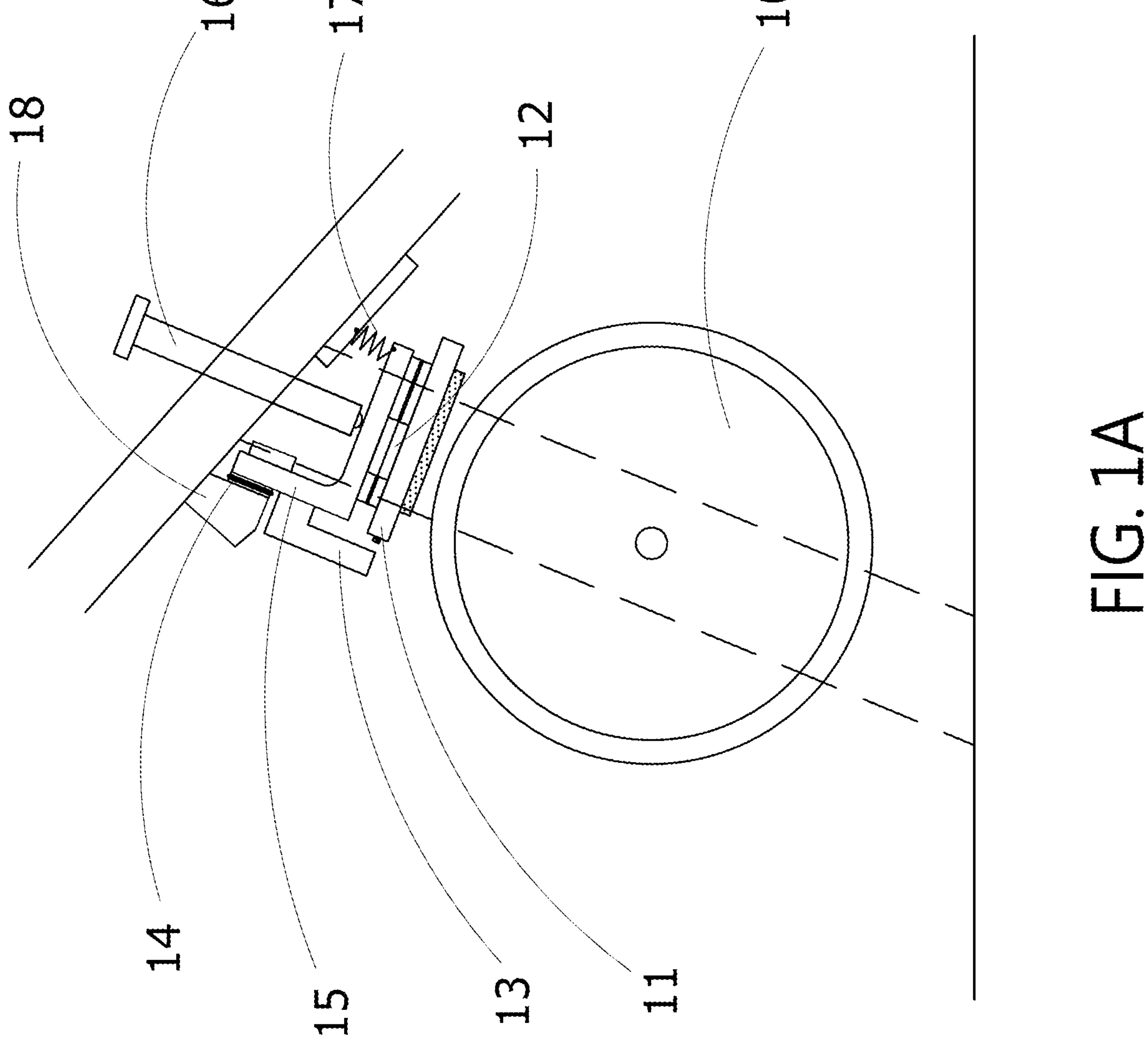
FIG. 1A is a schematic diagram for illustrating a method for calculating power by measuring a reaction force according to an example implementation of the present disclosure.

The following description contains specific information related to exemplary embodiments of the present disclosure. The drawings and their accompanying detailed descriptions according to the present disclosure are only exemplary embodiments. However, the present disclosure is not limited to these exemplary embodiments. Other variations and embodiments of the present disclosure will be apparent to those skilled in the art. Unless otherwise described, identical or corresponding elements shown in the drawings may be indicated by identical or corresponding reference numerals. Furthermore, the drawings and illustrations according to the present disclosure are generally not drawn to scale and are not intended to correspond to actual relative dimensions.

For purposes of consistency and ease of understanding, the same features have been marked by reference numerals in the exemplary drawings (but not marked as such in some illustrations). However, features disclosed in different embodiments may differ in other respects and thus should not be narrowly limited to those shown in the drawings.

The terms "at least one embodiment," "an embodiment," "a number of embodiments," "different embodiments," "some embodiments," "the present embodiment" may indicate that the embodiments according to the present disclosure as described may include a specific feature, structure or characteristic, but not every possible embodiment according to the present disclosure necessarily includes a particular feature, structure or characteristic. Further, the repeated use of the phrases "in an embodiment" and "in the present embodiment" do not necessarily refer to the same embodiment although they may be the same. In addition, the use of the phrase such as "embodiment" in connection with "the present disclosure" does not mean that all embodiments of the present disclosure necessarily include a particular feature, structure or characteristic, and should be understood as "at least some embodiments of the present disclosure" including the described particular feature, structure or characteristic. The term "coupled" is defined as connected, whether directly or indirectly through any intervening element, and is not necessarily limited to a physical connection. When the term "include/including" is used, it means "include/including, but are/is not limited to", and expressly indicates the open inclusion or relationship of the described combinations, groups, series and equivalents.

In addition, for explanation and non-limiting purposes, specific details such as functional entities, techniques, protocols, standards, etc., are set forth to provide an understanding of the described technologies. In other exemplary embodiments, detailed descriptions of well-known methods, techniques, systems, architectures, etc. are omitted so as not to obscure the illustrative description with unnecessary detail.

The terms "first", "second" and "third" described in the description of the present disclosure and the above-mentioned drawings are used for distinguishing different objects rather than describing a specific order. Furthermore, the term "include/including" and any variations thereof are intended to cover non-exclusive inclusion. For example, a process, method, system, product, or equipment that includes a series of steps or modules is not limited to the listed steps or modules, but optionally also includes steps or modules that are not listed, or optionally also includes other steps or modules inherent to the process, method, product or equipment.

The present disclosure will be further described in detail below in conjunction with the accompanying drawings and embodiments.

The primary objective of the present disclosure is to provide a measuring device and a measuring method and additionally use a two-step calculation. First, calculate a dynamic torque Tf of a drivetrain to overcome a flywheel magnetic resistance force (or frictional resistance force), and calculate a function of torque Tc of the drivetrain to overcome a mechanical friction and an inertia of the flywheel under a state of no magnetic resistance (or no frictional resistance). Second, adding Tf and Tc to obtain a dynamic total torque Td of a drivetrain shaft, then calculating a power, and an energy consumption of the drivetrain. The measuring device and measuring method according to the present disclosure are especially and suitably applied to display a power in sports or medical rehabilitation equipment. The above is based on the following formulas for torque (T), power (P), and energy consumption (E):

Torque=Tangential Force×Moment Arm ($T=F\times d$) Formula (1)

Power=Torque×Angular Velocity ($P=T\times\omega$) Formula (2)

Energy Consumption=Integral of Power over Time ($E=\int P\cdot dt$) Formula (3)

Figure 1B:
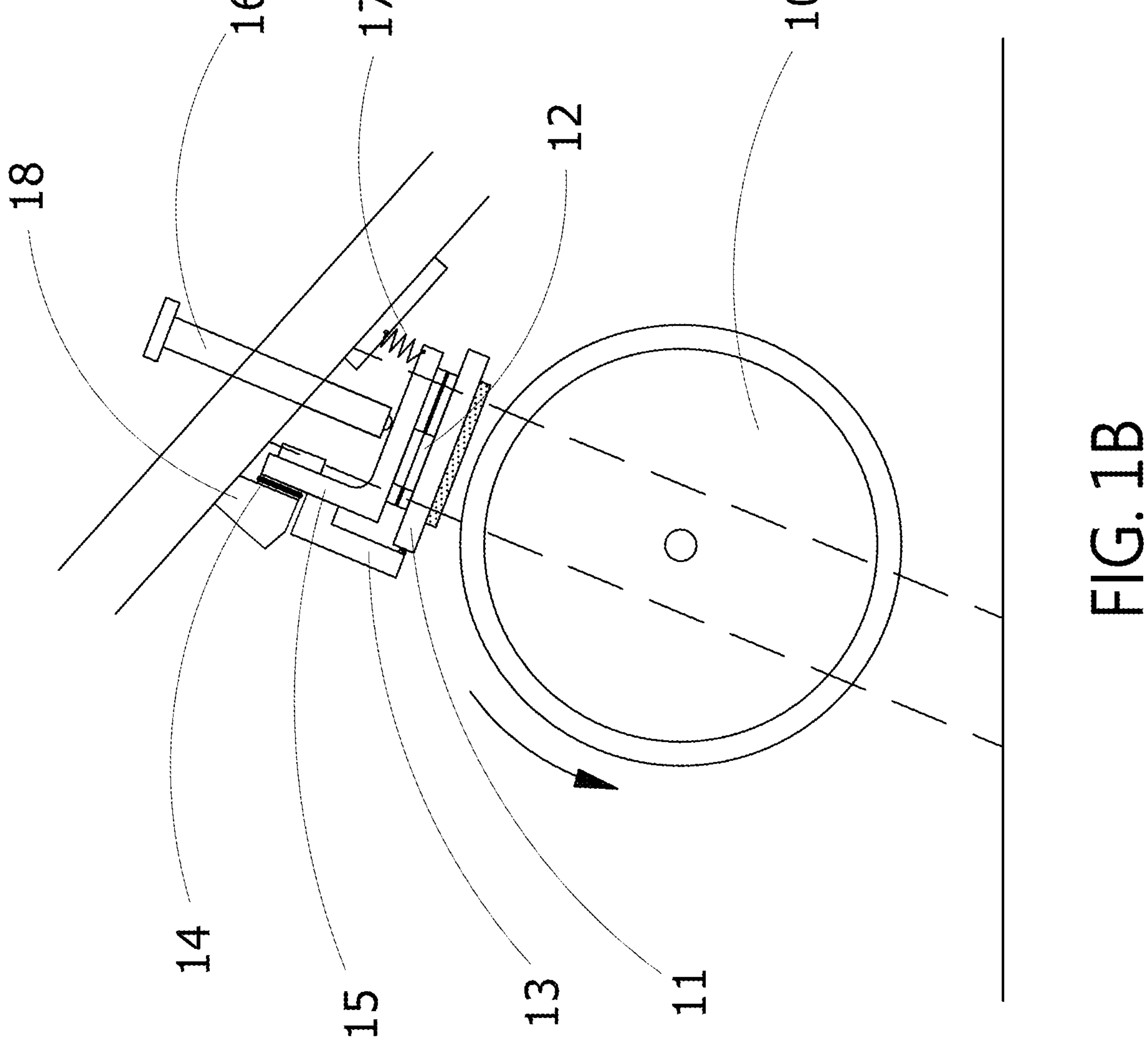
FIG. 1B is another schematic diagram for illustrating a method for calculating power by measuring a reaction force according an example implementation of the present disclosure.

Please refer to FIG. 1A and FIG. 1B, where FIG. 1A shows that a flywheel 10 is in a stationary state, and FIG. 1B shows that a flywheel 10 is in a rotating state. Referring to FIG. 1A again, a measuring device 1 mainly includes of a resistance mechanism 11, a horizontal sliding mechanism 12, a force sensor 13, a vertical sliding mechanism 14, a supporting base 15, a resistance adjusting mechanism 16, an elastic mechanism 17 and fixing mechanism 18. The horizontal sliding mechanism 12 is disposed between the resistance mechanism 11 and the supporting base 15, and more specifically, the horizontal sliding mechanism 12 is disposed at the bottom of the supporting base 15, such that the resistance mechanism 11 may move horizontally relative to the supporting base 15 through the horizontal sliding mechanism 12. Further, one side of the vertical sliding mechanism 14 is fixed to a fixing mechanism 18, while the other side of the vertical sliding mechanism 14 is fixed to a side of the supporting base 15, and the force sensor 13 is arranged on one side of the supporting base 15, such that the force sensor 13 and the supporting base 15 may simultaneously move vertically relative to the fixing mechanism 18. Furthermore, the horizontal sliding mechanism 12 moves translationally in the tangential direction of a flywheel 10, and the vertical sliding mechanism 14 moves in a direction perpendicular to the horizontal sliding mechanism 12.

Based on the above, the resistance mechanism 11 is connected to the horizontal sliding mechanism 12, and the resistance mechanism 11 may move translationally back and forth in the tangential direction of the flywheel 10 through the horizontal sliding mechanism 12. The force sensor 13 is fixed to the side portion of the supporting base 15, and the horizontal sliding mechanism 12 is fixed to the bottom of the supporting base 15. The resistance mechanism 11 may adjust the resistance strength according to the position of the supporting base 15, and the supporting base 15 may move along a vertical direction along the vertical sliding mechanism 14 relative to the fixing mechanism 18 so as to adjust the resistance of the flywheel 10. As seen from FIG. 1A, one end of the elastic mechanism 17 is connected to the supporting base 15, and the elastic force provided by the elastic mechanism 17 causes a plane of the supporting base 15 to be pressed against one end of the resistance adjusting mechanism 16 under a normal condition, such that the position of the supporting base 15 may be adjusted by the resistance adjusting mechanism 16. As such, the resistance strength may be adjustable up and down, and the user may adjust the distance between the resistance mechanism 11 and the flywheel 10 along a direction perpendicular to the tangential direction of the flywheel 10 to adjust the resistance of the flywheel 10. In one implementation, the shorter the distance or the tighter the contact between the resistance mechanism 11 and the flywheel 10, the greater the resistance of the flywheel 10.

In order to achieve the objective of introducing a power meter at a reasonable cost and achieve the same effect as achieved by the traditional power meter, the present disclosure provides a method for calculating dynamic torque and power of a drivetrain by measuring a force of a non-drive element (e.g., the resistance mechanism in the present embodiment), and the actions of the method are as follows:

Action 1: As shown in FIG. 1B, when the flywheel 10 rotates, the magnetic force or frictional force generated by the resistance mechanism 11 drives the resistance mechanism 11 to move translationally in the tangential direction of the flywheel 10 through the horizontal sliding mechanism 12, such that the resistance mechanism 11 and the force sensor 13 may be connected to and in contact with each other in the tangential direction of the flywheel 10, and the horizontal sliding mechanism 12 ensures that the resistance mechanism 11 may move translationally in the tangential direction of the flywheel 10 and the reaction force of the magnetic force or frictional force may not be affected by an angular component force. The magnetic resistance force (or frictional resistance force) and the reaction force in the tangential direction of the flywheel 10 may be measured through a connected contact between the resistance mechanism 11 and the force sensor 13.

In one implementation, the resistance mechanism 11 and the force sensor 13 are connected to each other, so a force may be applied to the force sensor 13 bidirectionally, such that a pulling force or a pushing force applied to the force sensor 13 may be measured.

In other words, the method for calculating power by measuring a reaction force according to the present disclosure is to adjust the distance between the resistance mechanism 11 and the flywheel 10 along a normal line direction to adjust a resistance force F generated by the resistance mechanism 11 and applied to the flywheel 10. The resistance mechanism 11 has a horizontal sliding mechanism 12 in the tangential direction of the flywheel 10 to make the resistance mechanism 11 connected to and in contact with a force sensor 13 for measuring a reaction force Fr of a resistance force that is generated in the tangential direction of the flywheel 10 and applied by the resistance mechanism 11 on the flywheel 10. When the resistance mechanism 11 induces a Lorentz force (or rubs to generate a friction force) as the resistance force. The reaction force Fr is a reaction force generated by the resistance force F applied by the resistance mechanism 11 on the flywheel 10.

Action 2: When the flywheel 10 rotates, the resistance mechanism 11 induces a Lorentz force (or rubs to generate a friction force) as the resistance force F against the rotation of the flywheel 10. According to Newton's third law of motion, when two objects interact with each other, the forces applied to each other are equal in magnitude and opposite in direction. Accordingly, the reaction force Fr applied by the resistance mechanism 11 to the force sensor 13 is measured to be equal to the resistance force F applied in the tangential direction of the flywheel 10.

Figure 2:
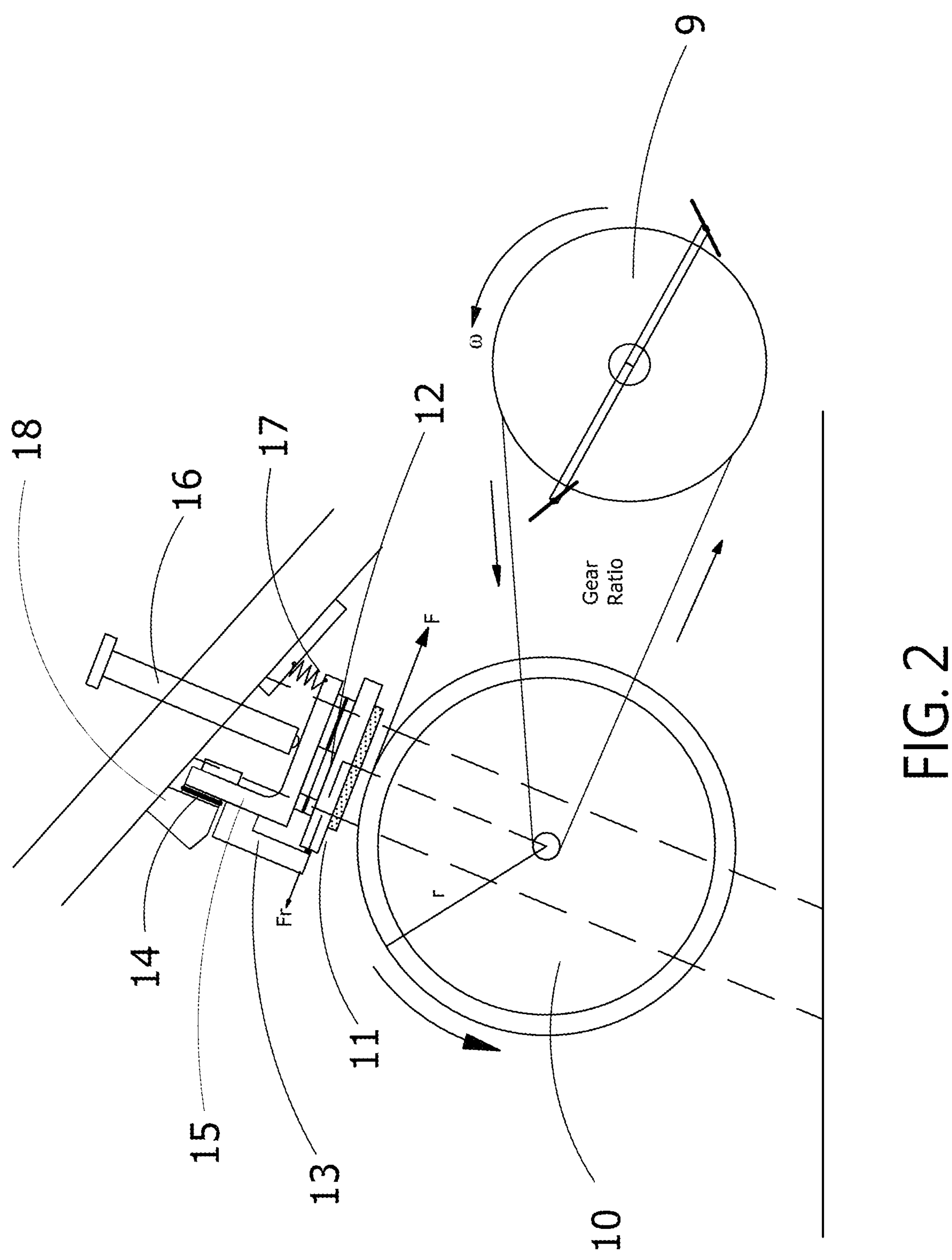
FIG. 2 is a schematic diagram for calculating a torque of a flywheel shaft and a torque of a drivetrain shaft according an example implementation of the present disclosure.

Action 3: Referring to FIG. 2, which shows a schematic diagram for calculating a torque of the shaft of the flywheel 10 and a torque of the shaft of a drivetrain 9. Since the resistance force F and the reaction force Fr are equal in magnitude and opposite in direction, a torque Tr of the shaft of the flywheel 10 to overcome a magnetic resistance force (or frictional resistance force) may be calculated by measuring the radius r of the flywheel 10, where the torque Tr equals to the resistance force F applied on the flywheel 10 multiply the radius r of the flywheel 10.

Action 4: Referring to FIG. 2, the reaction force Fr applied in the tangential direction of the flywheel 10 is the same in magnitude as and opposite in direction to the resistance force F applied in the tangential direction. The result of multiplying the reaction force Fr by the radius r or a moment arm of the flywheel 10 is equal to the torque Tr of the shaft of the flywheel 10 applied after the flywheel 10 overcomes a magnetic resistance or a frictional resistance, and the result of multiplying the torque Tr of the shaft of the flywheel 10 by a gear ratio of the flywheel 10 is equal to a torque Tf of the shaft of the drivetrain 9 for overcoming a magnetic resistance or a frictional resistance.

In one implementation, the torque Tf required by the shaft of the drivetrain 9 to overcome the resistance may be regarded as a variable torque, which is similar to a torque applied by an outdoor bicycle to overcome different climbing slopes.

Action 5: Since the frictional coefficient of a mechanism, such as a shaft, a belt, a chain or a pulley, and the inertia of the flywheel 10 are different in every kind of equipment, under a state of no magnetic resistance (or no frictional resistance), a torque Tc of the drivetrain shaft to overcome the mechanical friction and the inertia of the flywheel 10 under a state of no resistance will be different due to different equipment and different rotation speeds of the drivetrain.

Referring to FIG. 3A to FIG. 3D, showing curves of torques and power corresponding to different resistances and rotation speeds in an actual measurement according to the method of the present disclosure. However, according to the measured data, torque Tc tends to increase slightly and linearly as the rotation speed of the drivetrain 9 increases. Taking a Spin bike using for our experiment as an example, from 20 rpm to 200 rpm of rotation speed, the torque Tc of the drivetrain under a state of no magnetic resistance increases from 0.9 Nm to 1.2 Nm in a nearly linear manner. Therefore, the slope of the torque Tc relative to the change of rotation speed under a state of no resistance mechanism is different as the model of flywheel bicycle is different, and may be calibrated once in the factory. The torque Tc may be regarded as a function of rotation speed, i.e., Tc=f(rpm).

That is, under a state of no magnetic resistance or no frictional contact, the torque Tc of the drivetrain 9 to overcome the mechanical friction and the inertia of the flywheel 10 is a function of rotation speed of the drivetrain 9.

In one implementation, the method according to the present disclosure includes a pre-calibrating action, in which under a state of no magnetic resistance (or no contact-frictional resistance), when the flywheel 10 is at any rotation speed, the torque Tc required by the drivetrain 9 to overcome the mechanical friction and the inertia of the flywheel 10 is used to check and verify as a function Tc=f(rpm) corresponding to the change of rotation speed for the drivetrain 9. Thus, calculating, under a state of no resistance in the flywheel 10, the torque Tc required by the drivetrain 9 to overcome the mechanical friction and the inertia of the flywheel 10 at various rotation speeds, where the torque Tc may be regarded as a fixed torque of the drivetrain 9.

Action 6: Total torque Td of drivetrain shaft equals to a torque Tf to overcome magnetic resistance (or frictional resistance) plus a torque Tc to overcome mechanical friction and flywheel inertia when there is no magnetic resistance (or frictional resistance).

Therefore, the torque Tf of the flywheel 10 to overcome the magnetic resistance or frictional resistance is added to the torque Tc of the drivetrain 9 to overcome the mechanical friction and the inertia of the flywheel 10, such that to obtain the total torque Td applied to the shaft of the drivetrain 9.

Action 7: Power P equals to a total torque Td of drivetrain 9 shaft multiply an angular velocity ω of the shaft of the drivetrain 9 shaft, where the unit of the angular velocity ω: 1 radian/sec 9.549 rpm, and the unit of the power P defined as watt (Jules/sec).

Figure 3A:
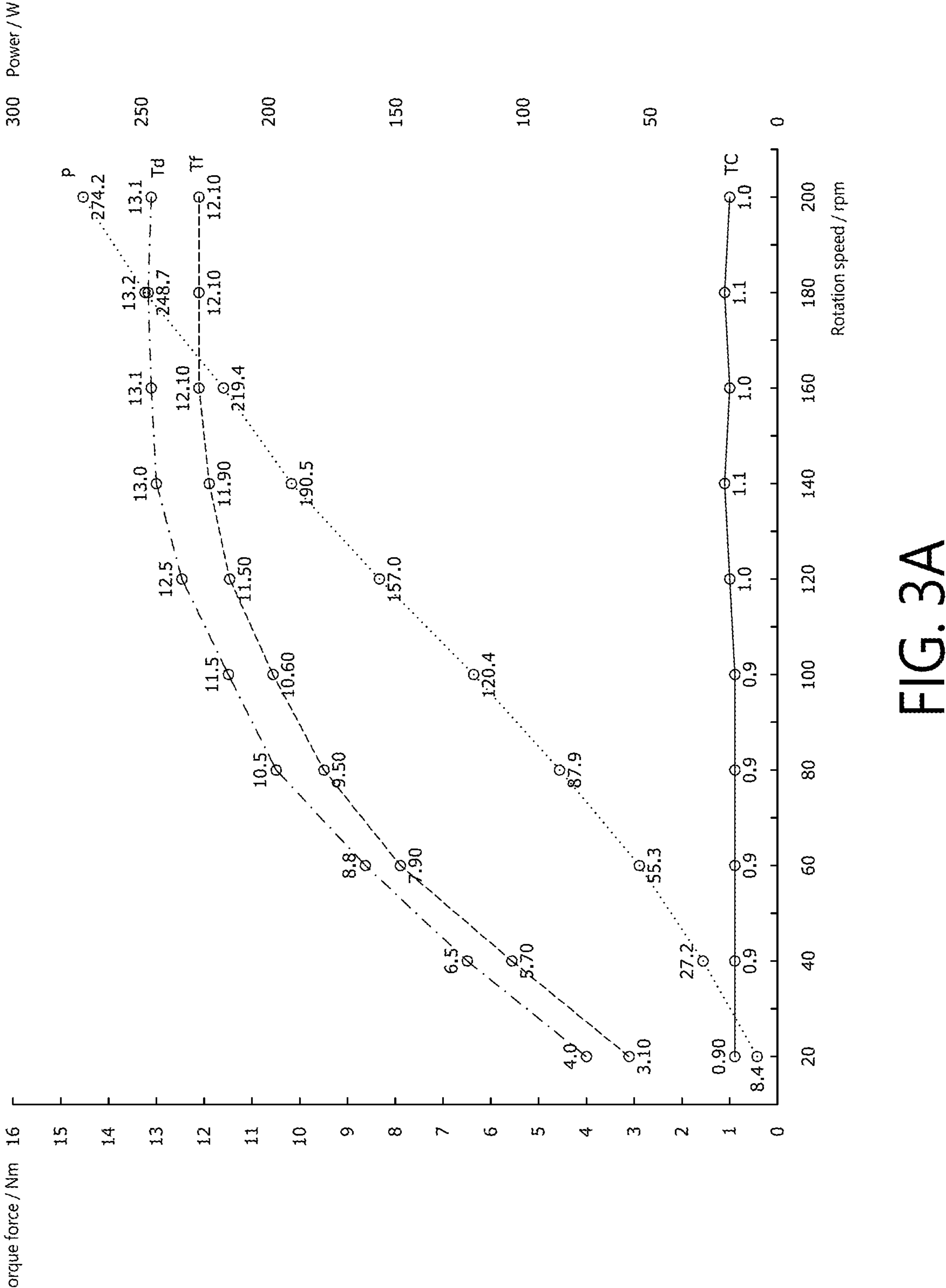
FIG. 3A to 3D are graphs illustrating curves of torques and power corresponding to different resistances and rotation speeds based on actual measurements according an example implementation of the present disclosure.
Figure 3B:
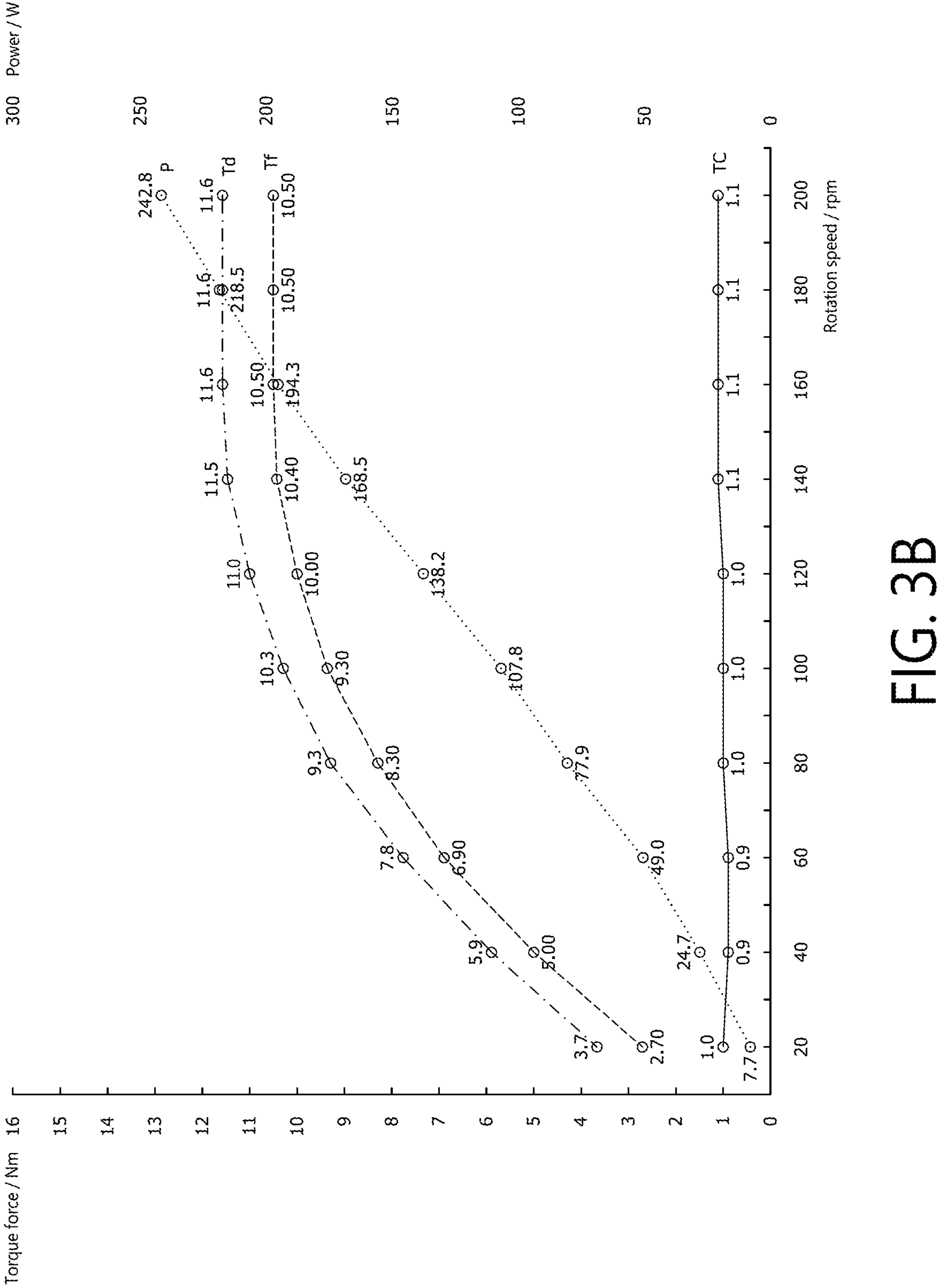
Figure 3C:
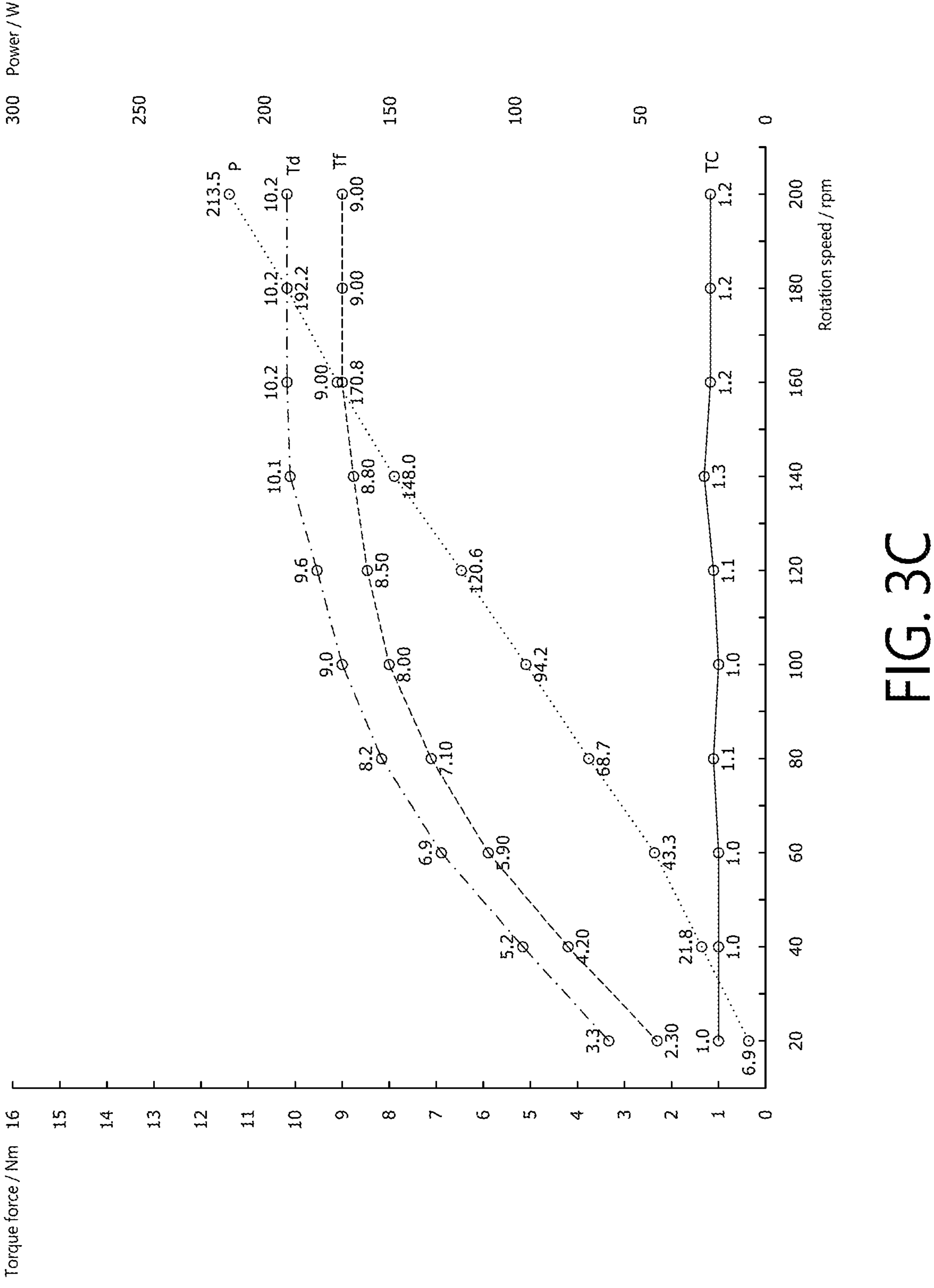
Figure 3D:
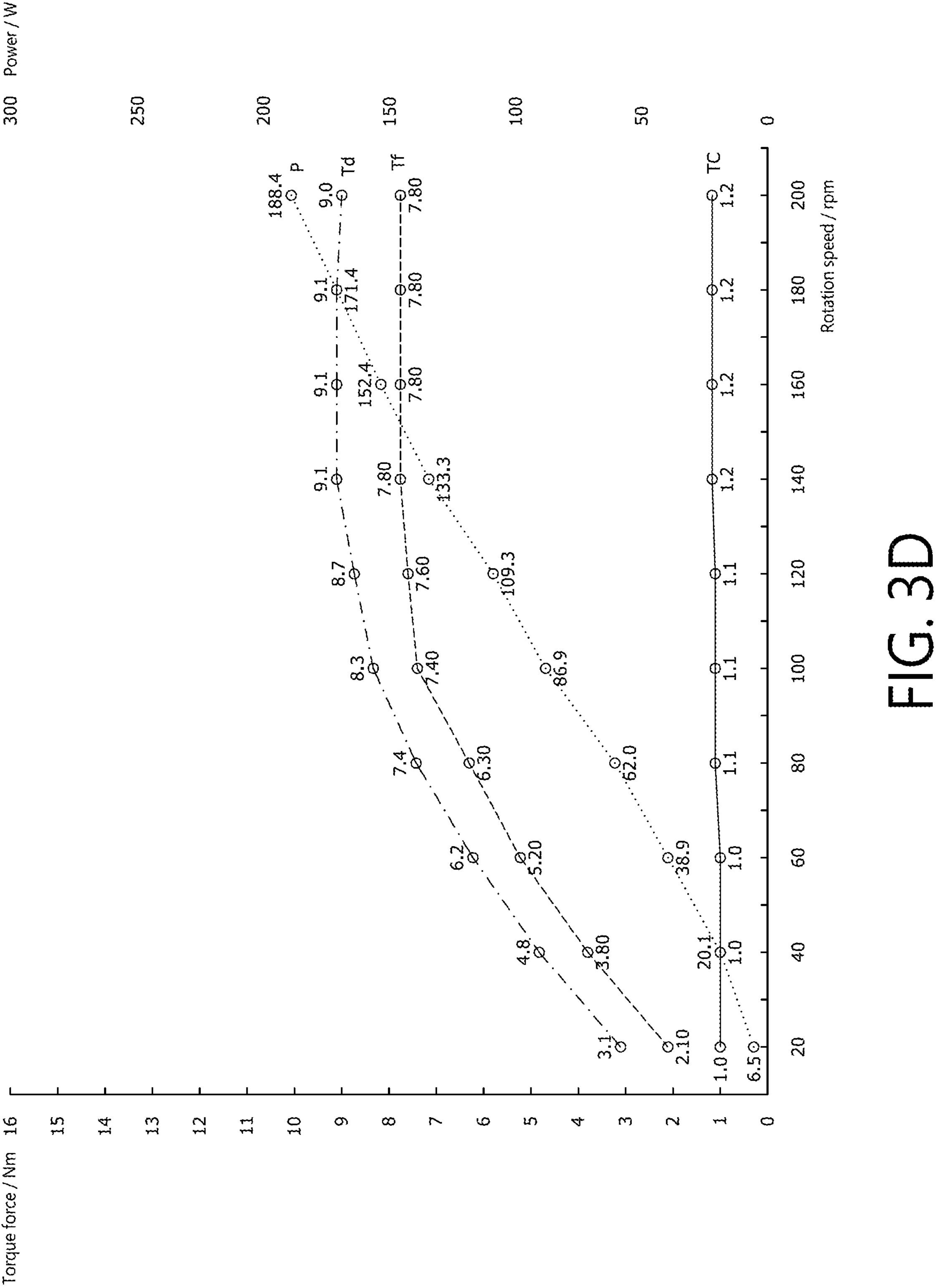

According to the above, for example, referring to FIG. 3A, at a rotation speed of 100 rpm, the torque Tc to overcome the mechanical friction and the inertia is 0.9 N·m when there is no magnetic resistance (or frictional resistance), and the torque Tf to overcome the magnetic resistance (or frictional resistance) is 10.6 N·m, so the total torque Td is 11.5 N·m, the angular velocity ω equals to 100/9.549, which equals to 10.47 radian/sec, and the power P equals to the total torque Td multiply the angular velocity ω, which equals to 120.4 watts.

Action 8: Energy consumption E=∫P·dt (integral of power over time), and the unit is in kilo joules (KJ).

Summary: The power P equals the total torque Td of the drivetrain shaft multiplied the angular velocity ω of the shaft of the drivetrain 9, and the energy consumption consumed by the resistance of the flywheel 10 equals the integral of power over time.

Figure 4:
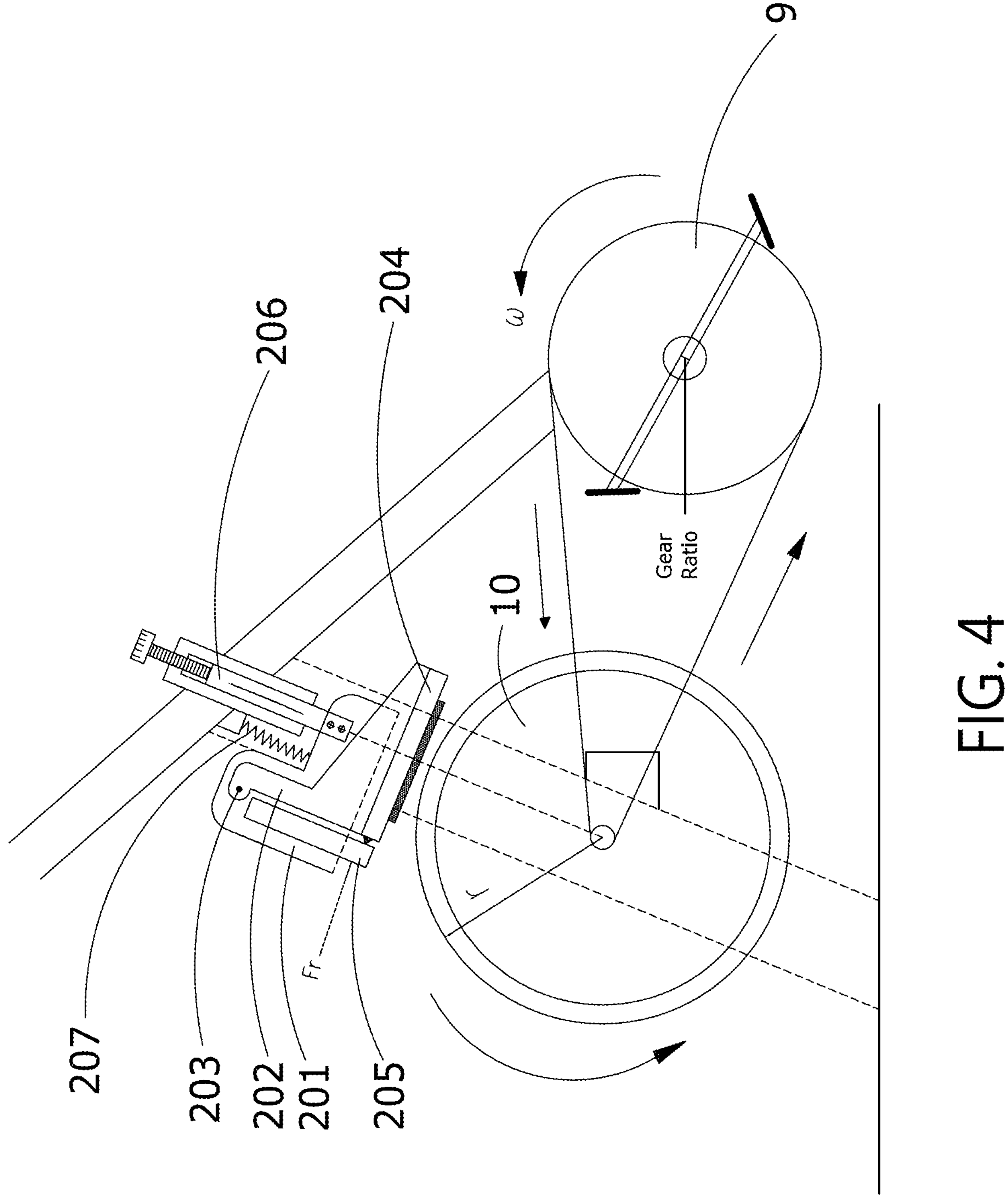
FIG. 4 is a schematic diagram illustrating a measuring device according an example implementation of the present disclosure.

Referring to FIG. 4, it shows another measuring device 20 according to the present disclosure, which includes a base 201, a swing mechanism 202, a pivot 203, a resistance mechanism 204, a force sensor 205, a resistance adjusting mechanism 206 and an elastic mechanism 207. The base 201 has the swing mechanism 202 disposed thereon, and the swing mechanism 202 has a pivot 203 fixed on the base 201, such that the swing mechanism 202 is able to swing freely relative to the base 201 with the pivot 203 functioning as a center. The resistance mechanism 204 is disposed at the bottom of the swing mechanism 202 and swings with the swing mechanism 202. One end of the force sensor 205 is fixed on the base 201, and the force sensor 205 remains parallel to a normal line direction of the shaft of a flywheel 10. Further, the base 201 is connected to a resistance adjusting mechanism 206, and the resistance adjusting mechanism 206 is along the normal line direction passing through the shaft of the flywheel 10. When the resistance adjusting mechanism 206 is adjusted to press down, the base 201 may be brought downward, such that the resistance mechanism 204 is closer to the flywheel 10. Furthermore, the base 201 is connected with the elastic mechanism 207, one end of the elastic mechanism 207 is connected to the base 201, and the other end of the elastic mechanism 207 is connected to a fixing mechanism. When the resistance adjusting mechanism 206 is adjusted back to an original state, the elastic mechanism 207 will further pull the base 201 back to increase the distance between the resistance mechanism 204 and the flywheel 10.

According to the above, during a process of adjusting resistance, the base 201 moves up and down along a normal line of the flywheel 10, and the resistance mechanism 204 is parallel to a tangential direction of the flywheel 10 during the process. When the flywheel 10 rotates forward, a reaction force Fr of a resistance force drives the resistance mechanism 204 to hit the force sensor 205. The mechanical deformation of the force sensor 205 is very small, so when the swing mechanism 202 is subjected to the reaction force Fr to hit the force sensor 205, the swing arc thereof may be regarded as a small linear motion. In other words, in some implements of the device, the resistance mechanism 204 hits the force sensor 205 in a direction parallel to the tangential direction of the flywheel 10, and a subsequent calculation method is similar to the method as described above, and will not be repeated here.

In summary, the present disclosure mainly calculates the total torque of the drivetrain in a two-step manner to correct the insufficiency of the calculation for the torque of the flywheel device. The resistance mechanism of the flywheel bicycle may basically simulate a climbing slope to be overcomed by a bicycle, which may be regarded as a torque or a variable torque additionally applied to overcome the slope, but it is impossible to completely calculate a torque and power exerted by a rider on the flywheel bicycle from a measured flywheel resistance force. If the resistance of the resistance mechanism is removed, the rider must also apply to the flywheel bicycle a torque, which is shown in the actual measurement as a linear relation that changes slightly with the rotation speed and may be regarded as a fixed torque or a function of rotation speed. Unless the fixed torque that removes the resistance of the resistance mechanism is added, the measurement and calculation for the torque and power for the resistance of the flywheel will not be enough to reflect a real situation of a drivetrain.

The present disclosure accurately measures and calculates the torque to overcome the resistance mechanism by changing the mechanism and method of measuring the torque. The mechanism and method according to the present disclosure may be especially and suitably applied to sports or medical rehabilitation equipment with a large consumer market, and the present disclosure adopts, with a different way of thinking, a design completely different from a traditional power meter, and instead calculates the torque Td of a drivetrain shaft by measuring the reaction force of the resistance mechanism as described above, thereby calculating the torque of the drivetrain more accurately, where the torque Td equals to the torque Tf to overcome the magnetic resistance (or frictional resistance) plus the torque Tc to overcome the mechanical friction and inertia under the state of no magnetic resistance (or no frictional resistance). Accordingly, the subsequent power P and energy consumption E may be easily obtained.

The use of a power meter made according to the present disclosure may greatly reduce the production cost of the power meter, which is difficult to be achieved by a traditional power meter whose price starts at hundreds of dollars. In such a manner, it is possible to introduce the power meter into various sports or medical rehabilitation equipments, and even cheap sports or medical rehabilitation equipments with a lower unit price may have the opportunity to be benefitted and popularized. Therefore, the present disclosure may be a very practical and progressive disclosure, which is worthy of promotion in the industry and disclosed to the public.

According to the above description, it is evident that the concepts described in the present application may be implemented using various techniques without departing from the scope of these concepts. Furthermore, while concepts have been described with specific reference to certain embodiments, one of ordinary skills in the art will recognize that changes may be made in form and detail without departing from the scope of these concepts. As such, the described embodiments are considered to be illustrative and not restrictive in all respects. Also, it should be understood that the present application is not limited to the particular embodiments described above, but many rearrangements, modifications and substitutions are possible without departing from the scope of the disclosure.

What is claimed is:

1. A method for measuring a reaction force of a resistance mechanism on a flywheel, the method comprising:

driving the resistance mechanism, when the flywheel rotates, to move translationally in a tangential direction of the flywheel through a horizontal sliding mechanism by a reaction force of a resistance force generated by the flywheel for the resistance mechanism, such that the resistance mechanism and a force sensor connectedly contact to each other in the tangential direction of the flywheel, and the horizontal sliding mechanism is configured such that the resistance mechanism moves translationally in the tangential direction of the flywheel and the reaction force may not be affected by an angular component force; and measuring, by the force sensor, the reaction force of a resistance force exerted by the resistance mechanism on the flywheel when the resistance mechanism connectedly contacts the force sensor, calculating the resistance force with the reaction force, and calculating a torque of a shaft of the flywheel with the calculated resistance force.

2. The method of claim 1, wherein the method comprising:

calculating a torque of a drivetrain conveyed from the flywheel to overcome the torque of the shaft of the flywheel, and adding the torque of the drivetrain conveyed from the flywheel to overcome the torque of the shaft of the flywheel and a torque under a state of no resistance to obtain a total torque of the drivetrain to calculate a power, an energy consumption, and a calorie consumption, wherein the method comprising:

adjusting a distance between the resistance mechanism and the flywheel in a direction to adjust the resistance force generated by the resistance mechanism, wherein the resistance mechanism translationally moves in the tangential direction of the flywheel through the horizontal sliding mechanism;

measuring a force by which the resistance mechanism connectedly contacts the force sensor in the tangential direction of the flywheel through the horizontal sliding mechanism, wherein the force is the reaction force of the resistance force exerted by the resistance mechanism on the flywheel;

measuring the reaction force, which is opposite in direction and the same in magnitude as the resistance force applied on the tangential direction of the flywheel where cuts a magnetic field or rubs against the resistance mechanism, wherein a result of multiplying the reaction force by a radius or a moment arm of the flywheel is equal to the torque of the shaft of the flywheel, and a result of multiplying the torque of the shaft of the flywheel by a gear ratio of the flywheel is equal to a torque of a shaft of the drivetrain to overcome the resistance force exerted by the resistance mechanism;

calculating a torque of the drivetrain to overcome a mechanical friction and an inertia of the flywheel under a state of no resistance, wherein the torque of the drivetrain is a function of rotation speed of the drivetrain;

adding the torque of the shaft of the drivetrain to overcome the resistance force exerted by the resistance mechanism and the torque of the drivetrain to overcome a mechanical friction and an inertia of the flywheel under a state of no resistance to obtain a total torque applied to the shaft of the drivetrain; and calculating a power that equals the total torque of the shaft of the drivetrain multiplied by an angular velocity of the drivetrain, wherein an energy consumption of the flywheel equals to an integral of power over time.

3. The method as claimed in claim 2, wherein the method is performed to measure a reaction force generated by a magnetic resistance on the flywheel cutting the magnetic field or a reaction force generated by a frictional resistance contacts and rubs against the flywheel, such that to calculate a torque to overcome a resistance of the flywheel.

4. The method of claim 3, wherein a torque of the flywheel to overcome a magnetic resistance or a frictional resistance is multiplied by a gear ratio to calculate a torque required by the shaft of the drivetrain to overcome a resistance force of the flywheel, and the torque required by the shaft of the drivetrain to overcome the resistance force is a variable torque and may be regard as a torque of an outdoor bicycle to overcome a climbing slope.

5. The method of claim 4, further comprising:

calculating a torque required by the drivetrain to overcome the magnetic resistance or the frictional resistance and calculating a torque required to overcome the mechanical friction and the inertia of the flywheel at various rotation speeds under the state of no resistance, wherein a sum of the torque required by the drivetrain to overcome the magnetic resistance or the frictional resistance and the torque required to overcome the mechanical friction and the inertia of the flywheel at various rotation speeds under the state of no resistance is the total torque applied to the shaft of the drivetrain.

6. The method of claim 5, wherein the method further comprises calculating a total power, an energy consumption, and a calorie consumption of a rider according to the total torque.

7. The method of claim 2, further comprising:

pre-calibrating, in which under a state of no magnetic resistance or no frictional resistance, when the drivetrain is at any rotation speed, the torque required to overcome the mechanical friction and the inertia of the flywheel is applied to check and verify a function of rotation speed of the drivetrain, such that to calculate, under a state of no resistance, the torque required by the drivetrain to overcome the mechanical friction and the inertia of the flywheel at various rotation speeds.

8. The method of claim 7, further comprising:

calculating a torque required by the drivetrain to overcome the magnetic resistance or the frictional resistance and calculating a torque required to overcome the mechanical friction and the inertia of the flywheel at various rotation speeds under the state of no resistance, wherein a sum of the torque required by the drivetrain to overcome the magnetic resistance or the frictional resistance and the torque required to overcome the mechanical friction and the inertia of the flywheel at various rotation speeds under the state of no resistance is the total torque applied to the shaft of the drivetrain.

* * * * *